United States Patent [19]

Kaveloski

[11] 4,392,322

[45] Jul. 12, 1983

[54] DISPOSABLE FLY TRAP

[76] Inventor: Robert J. Kaveloski, 39663 Balboa, Sterling Heights, Mich. 48078

[21] Appl. No.: 290,483

[22] Filed: Aug. 6, 1981

[51] Int. Cl.³ ............................................. A01M 1/10
[52] U.S. Cl. ..................................... 43/118; 43/122
[58] Field of Search .................. 43/107, 118, 115, 122

[56] References Cited

U.S. PATENT DOCUMENTS

| 192,578 | 7/1877 | Guthrie | 43/118 |
|---|---|---|---|
| 1,092,697 | 4/1914 | Curtis | 43/118 X |
| 1,187,969 | 6/1916 | Clifford | 43/115 |
| 1,320,017 | 10/1919 | Lurz | 43/118 |
| 1,606,568 | 11/1926 | Gross | 43/107 |
| 3,959,914 | 6/1976 | Kaveloski | 43/118 |
| 4,112,609 | 9/1978 | Kaveloski | 43/118 |

Primary Examiner—Nicholas P. Godici
Assistant Examiner—Charles L. Willis
Attorney, Agent, or Firm—Barnes, Kisselle, Raisch, Choate, Whittemore & Hulbert

[57] ABSTRACT

A fly trap in the form of a double arched disposable element formed from a single blank and retained in functional shape by identical end plates having recesses to receive the ends of the disposable element. The element forms a bridge between the end plates and has windows to provide light from the top and a cut-out section which folds in a reverse direction to the arched portions to provide an entrance chamber for the insects.

7 Claims, 7 Drawing Figures

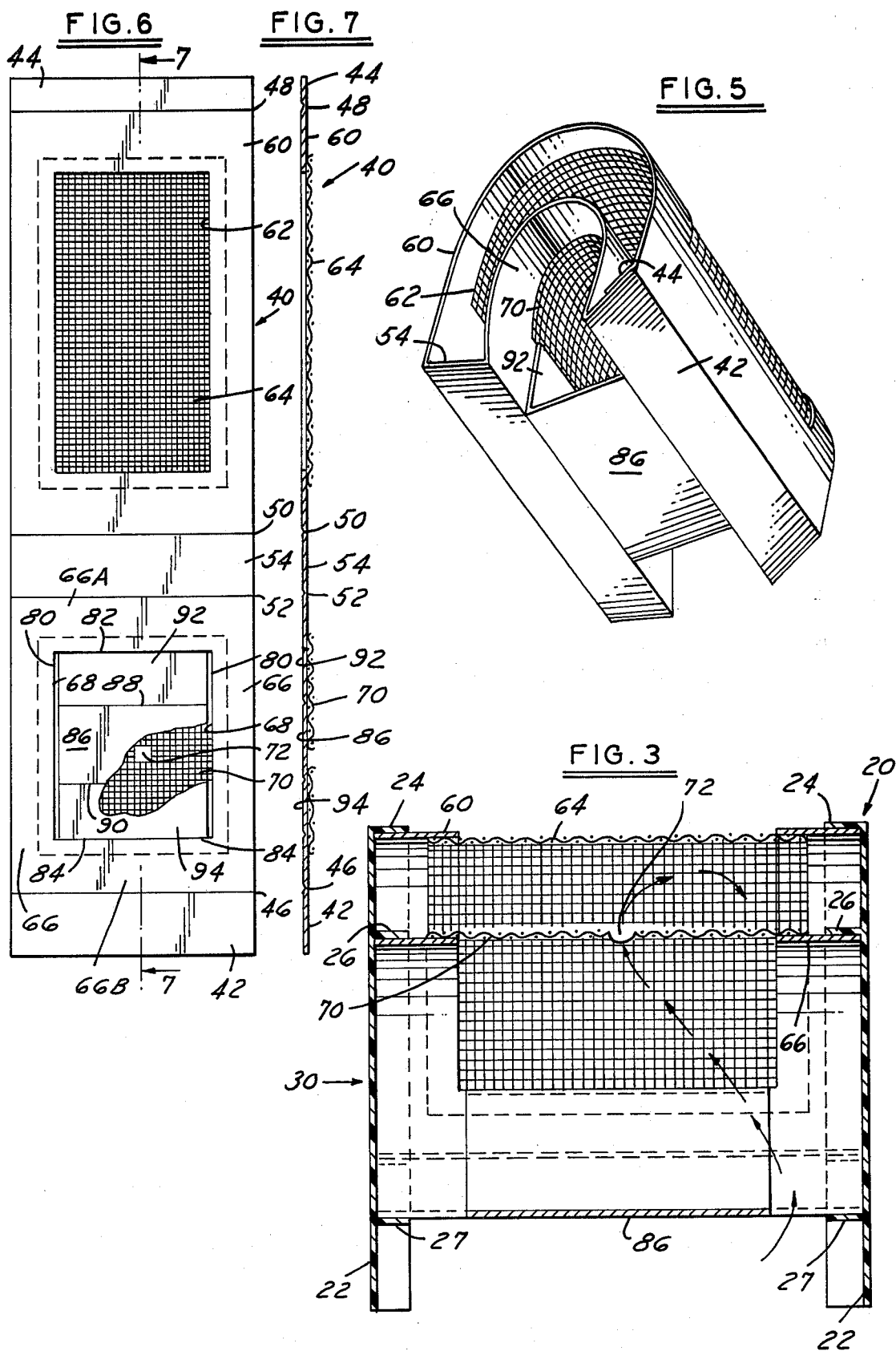

4,392,322

DISPOSABLE FLY TRAP

FIELD OF INVENTION

Prefabricated fly traps formed of sheet material assembled into a fly-trap housing which can be used and discarded.

BACKGROUND OF THE INVENTION

Reference is made to my previously issued U.S. Pat. No. 3,959,914, dated June 1, 1976, and U.S. Pat. No. 4,112,609, dated Sept. 12, 1978, each which is directed to a Prefabricated Disposable Fly Trap formed from sheet material.

The present invention presents a variation in construction for a double-arched fly trap made in various sizes with relatively sturdy end plates which can be readily cleaned and reused, and a spanning housing section which can be removed from the ends and disposed of at such times as it is sufficiently charged with expired flies.

It is thus an object to provide a fly trap which is inexpensive to manufacture, which can be packaged for shipment and sale in flat condition, which can be readily assembled by the user, and which can be provided with multiple disposable fillers to be used with relatively permanent end panels. A unique blank is provided to form the filler members.

Other objects and features of the invention will be found in the following description of the invention and the concommitment disclosure of detail directed to persons skilled in the art as to how to make and use the invention, all in connection with the best mode presently contemplated for the practice of the invention.

BRIEF DESCRIPTION OF THE DRAWINGS

Drawings accompany the disclosure and the various views thereof may be briefly described as:

FIG. 3, a vertical section taken on line 3—3 of FIG. 2.

FIG. 5, a perspective view of an assembled filler unit.

FIG. 6, a layout of the blank used to make the filler unit.

FIG. 7, a section on line 7—7 of FIG. 6.

DETAILED DESCRIPTION OF THE INVENTION AND HOW TO MAKE AND USE THE SAME

The previously referenced patents each disclose a disposable fly-trap with a double wall of arched configuration to form an entrance compartment with a light transmitting roof panel having an escape port leading to a U-shaped trap compartment capped by a second arched wall of light transmitting material.

A suitable bait attracts flies to the entrance compartment, usually through end openings. The flies tend to fly upward to the first arched wall and find the escape port which leads to the second trap compartment. These devices have been made as a single, foldable blank which can be shaped and folded to provide the double arched walls and the end enclosures to form the respective compartments.

The present disclosure is directed to a similar type of structure but the construction incorporates relatively permanent and reusable end walls with a disposable element to bridge these walls and form the entrance compartment and the U-shaped arched compartment.

Figure 1:
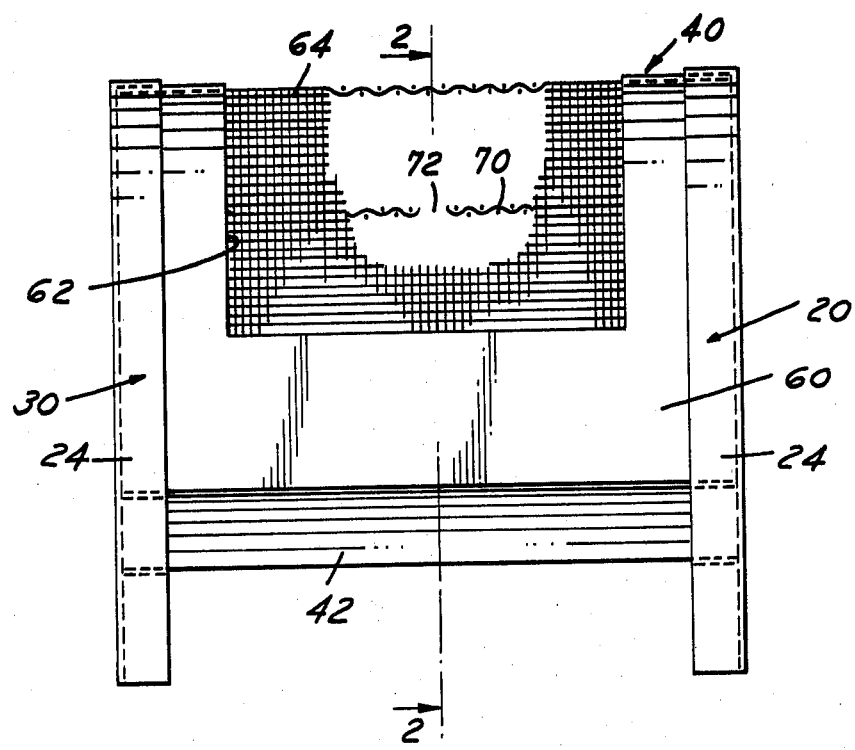
FIG. 1, a side view of an assembled fly trap.
Figure 2:
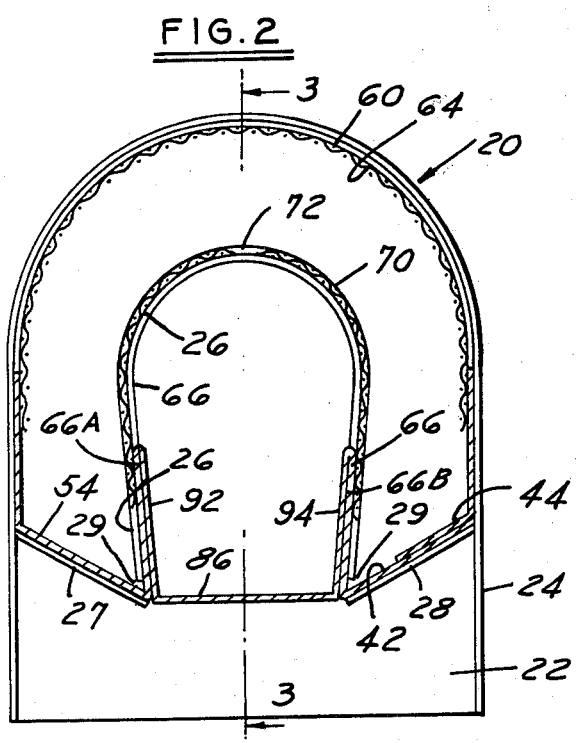
FIG. 2, a vertical section taken on line 2—2 of FIG. 1.
Figure 4:
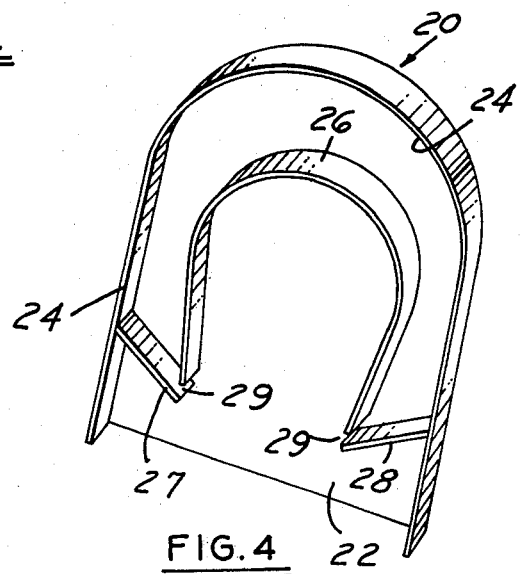
FIG. 4, a perspective view of the inner side of an end panel.

In FIG. 1, the assembled trap is illustrated in side elevation with two identical end panels 20 and 30 and a bridging disposable unit 40. In FIG. 2, the end panel 20 is shown in perspective. It consists of a flat end sheet or plate 22 with a curved upper edge tangential with vertical side edges. A narrow strip 24 extends around the periphery of the plate 22 normal to the plate. A horseshoe shaped strip 26 is secured to the plate 22 within the peripheral strip and spaced from it, the ends of strip 26 terminating above the base edge of plate 22. Two short straight strips 27, 28 are fastened normal to plate 22 and angled downwardly to terminate adjacent the lower ends of strip 26. A slot opening may be left between these strip ends.

The end panels are preferably formed of a dense plastic material which has structural form retaining strength. These panels may be formed of separate pieces heat welded or bonded together but may also be molded as a single integral unit. As indicated above, each end panel 20 and 30 can be identical, thus requiring a single mold.

The bridging disposable element which complates the trap compartment is shown in layout in FIG. 6. It consists of a rectangular sheet of flexible material having two end flaps 42 and 44 foldable on crease lines 46 and 48 respectively. Additional crease lines 50 and 52 lie on either side of a narrow panel 54. Panels 42 and 54 have essentially the same dimensions.

A long rectangular panel 60 has a window 62 closed by a sheet of light transmitting material such as a screen panel 64. A shorter rectangular panel 66, between panels 42 and 54, also has a window opening 68 closed by a sheet of light transmitting material such as a screen panel 70, this panel having a small opening 72 through which upward bound flies will pass.

The sheet material of opening 68, however, is not removed. Rather, a small strip is cut from each side of the opening to leave slits 80 on each side. Then fold creases 82 and 84 are formed at each end of the opening and a central panel 86 is delineated by crease lines 88 and 90. Thus, a short panel 92 is above crease line 88 and similar panel 94 lies below crease line 90 as viewed in FIG. 6. A section of this panel is shown in FIG. 7.

In utilizing the central and disposable element shown in FIGS. 6 and 7, the entire panel is arched and the end panels 42 and 44 are brought together and glued in overlapping relation as shown in FIG. 5. Panel 66 is arched inwardly while panels 86, 92 and 94 are folded outwardly. Thus, panel 92 folds against one end of panel 66 and panel 94 folds against the other end leaving the panel 86 as a bridging bottom panel underlying the arched portion of panel 66.

A transverse section of the properly shaped device is shown in FIG. 2 taken on line 2—2 of FIG. 1. A longitudinal section is shown in FIG. 3 taken on line 3—3 of FIG. 2.

In applying the shaped insert 40 so that it will bridge the two ends 20 and 30, the top arched portion is fitted below the arch of the outer end panels as shown in FIG. 2. The inner arched panel 66 is fitted over the horsehoe shaped arch 26. The short panels 42 and 54 lie against the angled strips 27, 28. The slits 29 accommodate the parts to allow this disposition. If desired, the inner arched panel may be fitted inside the horsehoe strip 26.

Thus, with the two ends fitted to the bridging insert, a stable structure is established which can be placed at any convenient location to attract and trap flies. As will be seen in FIGS. 3 and 5, an entrance opening is established at each end of panel 86 on which the bait may be conveniently placed. Flies instinctively fly upwardly toward the light transmitted by panels 64, 70 and meet the panel 70. There they eventually find the port 72 and arrive at the second trap compartment where they remain until the trap is disposed of.

What is claimed as new is as follows:

1. In a fly trap of the type utilizing spaced outer and an inner arch-shaped walls each having an outer light transmitting opening closed by a translucent sheet of material, and a base and fly inlet opening adjacent the base, that improvement which comprises:
   (a) a pair of independent end plates each provided with spaced outer and an inner confining means extending inwardly from said plates, and
   (b) a disposable central bridging unit of flexible material between said walls formed of a closed loop shaped to provide an outer arch confined by said outer confining means, and to provide an inner arch below and spaced from the outer arch and confined by said inner confining means, a portion of said loop below said inner arch being folded down in a direction opposite to the inner arch to provide a bottom for said trap with ends open to admit flies to the inner arch.

2. A fly trap as defined in claim 1, in which said disposable element is an elongate rectangular blank having spaced cut-out window openings, one larger one for the top arch and one smaller one for the inner arch, the smaller opening being cut at the sides only, the portion of the blank between said side cuts being foldable down in a direction opposite to that of the arch to provide said bottom open at the ends below said inner arch.

3. A fly trap as defined in claim 2 in which said portion of said blank between said side cuts is creased to fold into a U-shape to form said bottom, the bight of the U underlying the inner arch and the sides of said U lying adjacent end margins of said smaller opening.

4. A fly trap as defined in claim 1 in which said disposable element blank is fastened at its ends to form a closed loop foldable into the double arched shape.

5. A fly trap as defined in claim 1 in which said disposable element blank is fastened at its ends to form a closed loop, and provided with two lateral fold creases between each opening to permit the double arching of the portions surrounding said openings and to provide a connector wall between the ends of said arched portions spanning the distance between the base portions of said arched portions.

6. A fly trap as defined in claim 1 in which said inwardly extending confining means define an outer arch and an inner arch and said end plates further comprise inwardly extending support means between said inner and outer confining means adjacent the base of said arches.

7. A fly trap as defined in claim 5 in which said end plates have first inwardly extending confining means defining an outer arch and an inner arch, and second inwardly extending support means between said arches adjacent the base thereof, said connector walls of said blank lying adjacent said second inwardly extending support means.

* * * * *